United States Patent
Rus

(10) Patent No.: US 10,684,996 B1
(45) Date of Patent: *Jun. 16, 2020

(54) DISTRIBUTING DATA OF MULTIPLE LOGICALLY INDEPENDENT FILE SYSTEMS IN DISTRIBUTED STORAGE SYSTEMS INCLUDING PHYSICALLY PARTITIONED DISKS

(71) Applicant: Quantcast Corporation, San Francisco, CA (US)

(72) Inventor: Silvius V. Rus, Orinda, CA (US)

(73) Assignee: Quantcast Corporation, San Francisco, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/702,258

(22) Filed: Sep. 12, 2017

Related U.S. Application Data

(63) Continuation of application No. 14/484,639, filed on Sep. 12, 2014, now Pat. No. 9,792,295, which is a
(Continued)

(51) Int. Cl.
*G06F 16/182* (2019.01)
*G06F 3/06* (2006.01)
*G06F 16/27* (2019.01)

(52) U.S. Cl.
CPC .......... *G06F 16/182* (2019.01); *G06F 3/067* (2013.01); *G06F 16/278* (2019.01)

(58) Field of Classification Search
CPC ....... G06F 16/182; G06F 16/278; G06F 3/067
See application file for complete search history.

(56) References Cited

U.S. PATENT DOCUMENTS

| 5,317,728 A | 5/1994 | Tevis |
| 5,970,495 A | 10/1999 | Baru et al. |

(Continued)

OTHER PUBLICATIONS

Glagoleva et al. "A Load Balancing Tool Based on Mining Access Patterns for Distributed File System Severs", 35th Hawaii International Conference on System Sciences, IEEE, 2002.
(Continued)

*Primary Examiner* — Alford W Kindred
*Assistant Examiner* — Lin Lin M Htay
(74) *Attorney, Agent, or Firm* — Robin W. Reasoner; Andrea Wheeler

(57) ABSTRACT

A distributed storage system maintains multiple logically independent file systems. Each file system includes a data set stored by a storage device of the distributed storage system. During operation, access pattern levels for the multiple logically independent file systems are determined. Thereafter, the data sets included in the multiple logically independent file systems are redistributed across multiple storage devices of the distributed storage. Redistribution of a particular data set is based at least in part on the particular file system including the particular data set and on the determined access pattern levels for the multiple logically independent file systems. In addition, each disk of a plurality of disks in the distributed storage includes a physically separated partition dedicated to storing the data of the file system that is most frequently accessed. The distribution of data is based at least in part on the presence of the physically separated partition.

12 Claims, 8 Drawing Sheets

Related U.S. Application Data continuation-in-part of application No. 13/760,933, filed on Feb. 6, 2013, now Pat. No. 9,811,529.

(56) References Cited

U.S. PATENT DOCUMENTS

| | | |
|---|---|---|
| 6,301,605 B1 | 10/2001 | Napolitano et al. |
| 8,112,395 B2 | 2/2012 | Patel et al. |
| 9,229,657 B1 | 1/2016 | Rus et al. |
| 9,811,529 B1 | 11/2017 | Rus et al. |
| 2002/0120763 A1 | 8/2002 | Miloushev et al. |
| 2002/0124137 A1* | 9/2002 | Ulrich .................. G06F 3/0613 711/113 |
| 2002/0136406 A1 | 9/2002 | Fitzhardinge |
| 2003/0115218 A1* | 6/2003 | Bobbitt ................ G06F 16/188 |
| 2003/0115434 A1 | 6/2003 | Mahalingam |
| 2004/0078466 A1 | 4/2004 | Coates |
| 2004/0120225 A1 | 6/2004 | Dalal et al. |
| 2004/0123063 A1 | 6/2004 | Dalal et al. |
| 2005/0102484 A1 | 5/2005 | Liu |
| 2005/0144514 A1 | 6/2005 | Ulrich et al. |
| 2006/0101025 A1 | 5/2006 | Tichy et al. |
| 2007/0088703 A1 | 4/2007 | Kasiolas et al. |
| 2008/0005475 A1 | 1/2008 | Lubbers et al. |
| 2008/0263103 A1 | 10/2008 | McGregor |
| 2009/0077097 A1* | 3/2009 | Lacapra .............. G06F 16/119 |
| 2009/0119304 A1* | 5/2009 | Preslan ............... H04L 67/1097 |
| 2010/0036858 A1* | 2/2010 | Patel ....................... G06F 16/10 707/822 |
| 2010/0274982 A1 | 10/2010 | Mehr et al. |
| 2011/0107053 A1 | 5/2011 | Beckmann et al. |
| 2011/0138148 A1* | 6/2011 | Friedman .............. G06F 3/0613 711/173 |
| 2012/0059978 A1 | 3/2012 | Rosenband et al. |
| 2012/0117297 A1 | 5/2012 | Ish |
| 2013/0262533 A1 | 10/2013 | Mitra et al. |
| 2014/0006354 A1 | 1/2014 | Parkison |
| 2014/0032595 A1 | 1/2014 | Makkar |

OTHER PUBLICATIONS

United States Office Action, U.S. Appl. No. 13/760,933, dated Feb. 13, 2015, 40 pages.
United States Office Action, U.S. Appl. No. 13/760,933, dated Aug. 28, 2015, 42 pages.
United States Office Action, U.S. Appl. No. 13/760,933, dated Jun. 30, 2016, 17 pages.
United States Office Action, U.S. Appl. No. 13/760,933, dated Mar. 2, 2017, 17 pages.
United States Office Action, U.S. Appl. No. 14/484,639, dated Jan. 25, 2017, 22 pages.
United States Office Action, U.S. Appl. No. 14/484,639, dated May 4, 2016, 45 pages.
United States Office Action, U.S. Appl. No. 14/484,639, dated Aug. 27, 2015, 42 pages.
United States Advisory Action, U.S. Appl. No. 13/760,933, dated May 24, 2017, 3 pages.
United States Office Action, U.S. Appl. No. 15/717,453, dated Feb. 6, 2020, 29 pages.

* cited by examiner

Prior to Redistribution

Following Redistribution

DISTRIBUTING DATA OF MULTIPLE LOGICALLY INDEPENDENT FILE SYSTEMS IN DISTRIBUTED STORAGE SYSTEMS INCLUDING PHYSICALLY PARTITIONED DISKS

CROSS-REFERENCE TO RELATED APPLICATION

This application is a continuation of U.S. Non-Provisional application Ser. No. 14/484,639 entitled "Distributing Data of Multiple Logically Independent File Systems in Distributed Storage Systems Including Physically Partitioned Disks" by Silvius V. Rus, filed on Sep. 12, 2014, which is a continuation-in-part of U.S. application Ser. No. 13/760,933 entitled "Automatically Redistributing Data of Multiple File Systems in a Distributed Storage System" by Silvius V. Rus and Thileepan Subramaniam, filed on Feb. 6, 2013, all of which are hereby incorporated by reference in their entirety.

BACKGROUND

1. Technical Field

This disclosure pertains in general to distributed storage, and in particular to distributing data of multiple file systems on disks in a distributed storage system.

2. Description of Related Art

Distributed storage systems often store data across hundreds or thousands of interconnected storage devices (e.g., magnetic-based hard drives). Such data may be associated with different file systems managed by the distributed storage systems. For example, a distributed storage system may store data for a file system primarily used for working type data (e.g., a work file system). The distributed storage system may further store data for a different file system primarily used for storing backup copies of data (e.g., a backup file system). In order to store new data, a distributed storage system typically selects a storage device that has available free space. Following identification of the storage device, the distributed storage system allocates the new data to the identified storage device accordingly. Such selection of the storage device does not consider the particular file system with which the data is associated.

One problem with such a storage technique is that data hot spots are often created within current distributed storage systems. More specifically, by storing data based on available storage, the file systems of a distributed storage system may each have a disproportionate amount of the file system's data concentrated on a small number of storage devices. For example, while a distributed storage system may have one hundred storage devices, the data of a working file system may be concentrated on only five of the storage devices. For a file system that is frequently accessed or "hot," such concentrations can cause retrieval of the file system's data to be bottlenecked by performance limitations of the small number of storage devices.

Due to the aforementioned problems, the performance levels (e.g., overall data throughputs) of current distributed storage systems frequently become poor over time. As a consequence of this inefficiency, the time consumed by retrieving data from the distributed storage systems can rise to unnecessarily high levels.

SUMMARY

Embodiments of the invention include a method, a non-transitory computer readable storage medium and a system for distributing data of multiple file systems in a distributed storage system that includes a dedicated partition of each of a plurality of disks to store frequently accessed data.

Embodiments of the method include maintaining multiple logically independent file systems. Each file system includes a data set stored by a distributed storage. During operation, access pattern levels for the multiple logically independent file systems are determined. Thereafter, the data sets included in the multiple logically independent file systems are redistributed across multiple storage devices of the distributed storage. In one aspect, redistribution of a particular data set is based at least in part on the particular file system including the particular data set and on the determined access pattern levels for the multiple logically independent file systems. In one implementation, redistribution is performed according to a uniform redistribution scheme. In particular, a data set of a particular file system is spread evenly or substantially evenly across the multiple storage devices. In another implementation, redistribution is performed according to a proportional distribution scheme. Specifically, a data set of a particular file system is spread across the multiple storage devices in proportional to the bandwidths of the storage devices.

According to another aspect of embodiments of the invention, each disk of a plurality of disks in the distributed storage system includes a physically separated partition that is dedicated to storing the data of a file system that is most frequently accessed. This physically separated partition corresponds to the outside track of the disk. Data from an outer track of a disk takes less time to read than the same amount of data from an inner track because the disk spins at a constant rate and the circumference of an outer track is larger than the circumference of an inner track. This data access speed differential between outer and inner tracks assumes that data is being read in large enough quantities that the "seek" time does not dominate the speed advantage of reading from an outer track. When data is read from spin disks in small quantities, the "seek" time consumed may diminish the speed advantage of reading from an outer track. We assume throughout this application that data is accessed in large enough quantities such that a speed advantage exists from reading from an outer track. Because operations systems and software applications that access data from spin disk are generally consciously designed or optimized to access spin disk devices in large quantities, this assumption is reasonable in many circumstances. Thus, when data is distributed across multiple storage devices of the distributed storage, according to one embodiment, the distribution is based at least in part on the presence of the physically separated partition dedicated to storing the data of the file system that is most frequently accessed.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Figure (FIG. 1 is a high-level block diagram of a computing environment for automatically redistributing data of multiple file systems in a distributed storage system according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Figure 1:
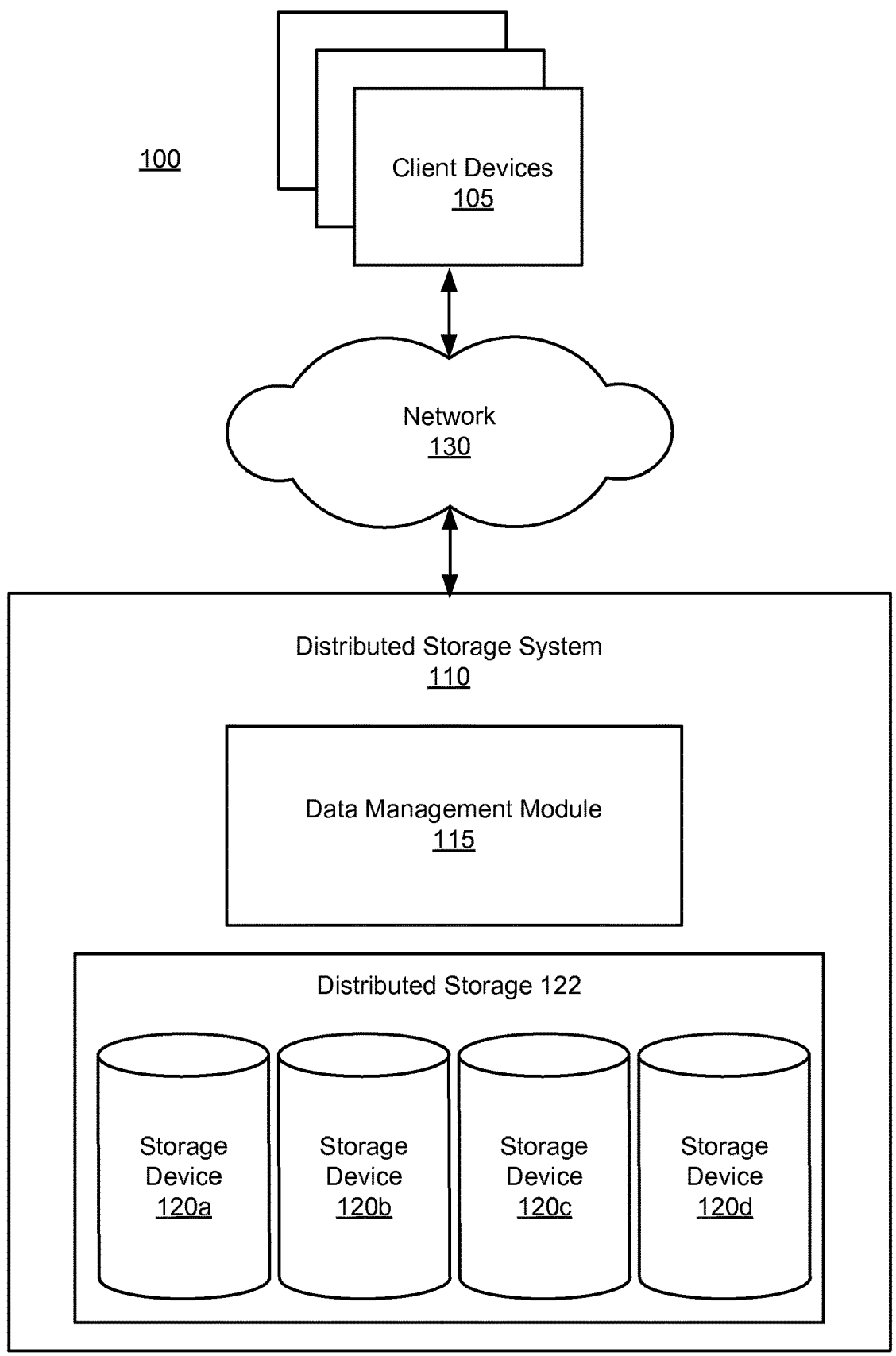

FIG. 1 is a high-level block diagram of a computing environment for automatically redistributing or rebalancing data of multiple file systems in a distributed storage system in accordance with an embodiment of the invention. In particular, the environment 100 can be used to periodically redistribute data associated with the same file systems uniformly or proportionally across storage devices of the distributed storage system. As a result, the distributed storage system can avoid large amounts of data associated with frequently accessed file systems to be concentrated within small numbers of storage devices. Hence, the overall data throughput of the distributed storage system can be improved.

As shown in FIG. 1, the computing environment 100 includes client devices 105 and a distributed storage system 110 communicating with one another via the network 130. Only three client devices 105 are shown in FIG. 1 for purposes of clarity, but those of skill in the art will recognize that typical environments can have hundreds, thousands, millions, or even billions of client devices 105.

The network 130 enables communications between the client devices 105 and the distributed storage system 110. In one embodiment, the network 130 uses standard communications technologies and/or protocols, and may comprise the Internet. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The client devices 105 are electronic devices used by users to exchange data with the distributed storage system 110 via the network 130. The data exchanged between the client devices 105 and the distributed storage system 110 can include one or more data files (e.g., database files, word processing files, spreadsheet files, audio files, images files, and/or any other suitable types of files). Each of the client devices 105 may be a suitable computing device. For example, an individual client device 105 may be a mobile computing device, such as a smartphone, tablet device, portable gaming device, e-reading device, personal digital assistant (PDA), etc. An individual client device 105 may also be another device, such as a desktop computer system, laptop, workstation, or server. In one aspect, the client devices 105 each execute a suitable operating system, such as Android, Apple iOS, a Microsoft Windows-compatible operating system, Apple OS X, UNIX, and/or a Linux distribution. The client device 105 may further execute suitable software applications, such as a web browser (e.g., Google Chrome, Microsoft Internet Explorer, Apple Safari, Mozilla Firefox, etc.), a native application (e.g., Microsoft Word for the Windows Operating System), etc.

The distributed storage system 110 stores data received from the client devices 105 and retrieves data requested by the client devices 105 via the network 130. As shown in FIG. 1, the distributed storage system includes a distributed storage 122 and a data management module 115.

The distributed storage 122 stores data received from the client devices 105. As shown in FIG. 1, the distributed storage 122 includes one or more interconnected storage devices 120, at least some of which include disk storage. In one aspect, the storage devices 120 are operated as a single logical entity despite being separate physical devices. Only four storage devices 120 are shown in FIG. 1 for purposes of clarity, but those of skill in the art will recognize that typical environments can have hundreds, thousands, or millions of interconnected storage devices 120 located in one or more geographical locations.

In one aspect, each of the storage devices 120 is a suitable storage device, such as a magnetic-based hard drive, a flash-based storage device (e.g., a NAND based solid state hard drive), an optical storage device, a storage device based on random access memory, and/or the like. In one embodiment, at least some of the storage devices 120 include storage disks. In one embodiment, the storage devices 120 are each the same type of storage device and have similar device characteristics. For example, each of the storage devices 120 may be a magnetic-based hard drive having 1 TB of storage space and operating at 7200 revolutions per minute (RPM). In another embodiment, the storage devices 120 are diverse storage devices having varying device characteristics. For example, referring to FIG. 1, the storage devices 120a and 120b may be magnetic-based hard drives having 1 TB of storage space and operating at 10,000 RPM. The storage device 120c may be a magnetic-based hard drive having 2 TB of storage space and operating at 7200 RPM. Lastly, the storage device 120d may be a flash-based storage device having 480 GB of storage space.

The data management module 115 manages the storage and retrieval of data stored in the distributed storage 122. In one implementation, the data management module 115 additionally manages multiple file systems each including or otherwise associated with a different logically independent portion or set of the stored data. In one aspect, each of the file systems may be logically independent and/or separate from the other file systems. In particular, each file system may have its own unique file system identifier, user accounts, file access controls (e.g., access control lists), organizational structures (e.g., directories or folders), and/or other operational data. Each file system may further be associated with data used for different types of purposes or functions. For example, a first file system may be associated with data retrievable for processing by the client devices 105, including data files such as spreadsheets, software applications, database files, etc. Such a file system may be referred to as a "work" file system. A second file system may be associated with data that is created temporarily as a result of data processing. Such a file system may be referred to as a "sort" file system. A third file system may be associated with log data describing transactions performed by the distributed storage system 110 and/or the client devices 105 (e.g., information describing types of processing performed by the client devices 105). Such a file system may be referred to as a "log" file system. A fourth file system may be associated with backup copies of at least some of the data associated with the work file system. Such a file system may be referred to as a "backup" file system. Among these file systems, the "sort" file system typically has an intensive access pattern comprising many reads and writes in rapid succession, and thus often requires the highest access speeds among these file systems.

In one aspect, even though the file systems managed by the distributed management module 115 are logically separate, the file systems may be maintained using the same type of underlying file management technology, such as the Hadoop Distributed File System (HDFS) variant. More specifically, each of the file systems may utilize the same data format types and/or organizational structure types.

In one aspect, the data management module 115 periodically redistributes or rebalances the data associated with the multiple file systems. More specifically, the data management module 115 shifts or moves the data such that data associated with the same file systems are spread out across the storage devices 120 of the distributed storage 122. In one embodiment, the data management module 115 redistributes data associated with the same file system uniformly across the storage devices 120. In another embodiment, the data management module 115 redistributes data associated with the same file system proportionally across the storage devices 120 according to the bandwidths (speeds) or some other performance measure of the storage devices 120.

By redistributing data in the manner described, the data management module 115 enables the overall data throughput (e.g., overall read throughput) of the distributed storage 122 to be improved. More specifically, data associated with the same file systems may have similar access patterns. Thus, by redistributing data from the same file systems uniformly or proportionally, the data management module 115 prevents data of frequently accessed file systems from being concentrated on a small number of storage devices 120. In doing so, performance bottlenecks associated with retrieving large amounts of a file system's data from a small number of storage devices 120 can be avoided. Put another way, by spreading data associated with a particular file system across a large number of storage devices 120 rather than concentrating the data in a small number of storage devices 120, each storage device 120 is required to handle fewer data operations. As a result, the impact of limitations with respect to the number of data operations a storage device 120 is able to perform within a given timeframe is minimized.

The performance of the distributed storage 122 can further be improved through the physical partitioning of disks in the storage devices 120. In one embodiment, each disk of a plurality of disks in the distributed storage 122 includes a physically separated partition that is dedicated to storing the data of a file system that is most frequently accessed. This physically separated partition corresponds to the outside track of the disk, near the outer edge of the disk. Data from an outer track of a disk take less time to read than the same amount of data from an inner track near the inner edge of the disk because the disk spins at a constant rate, regardless of the location from which data is being read or to which data is being written. When data is distributed across multiple storage devices of the distributed storage, the distribution is based at least in part on the presence of the physically separated partition dedicated to storing the data of the file system that is most frequently accessed.

Hence, through minimizing the effects of performance bottlenecks, the data management module 115 enables the overall data throughput of the distributed storage system 110 to be improved. As a result, retrieval of data from the distributed storage system 110 can be performed in a timely and efficient manner.

System Architecture

Figure 2:
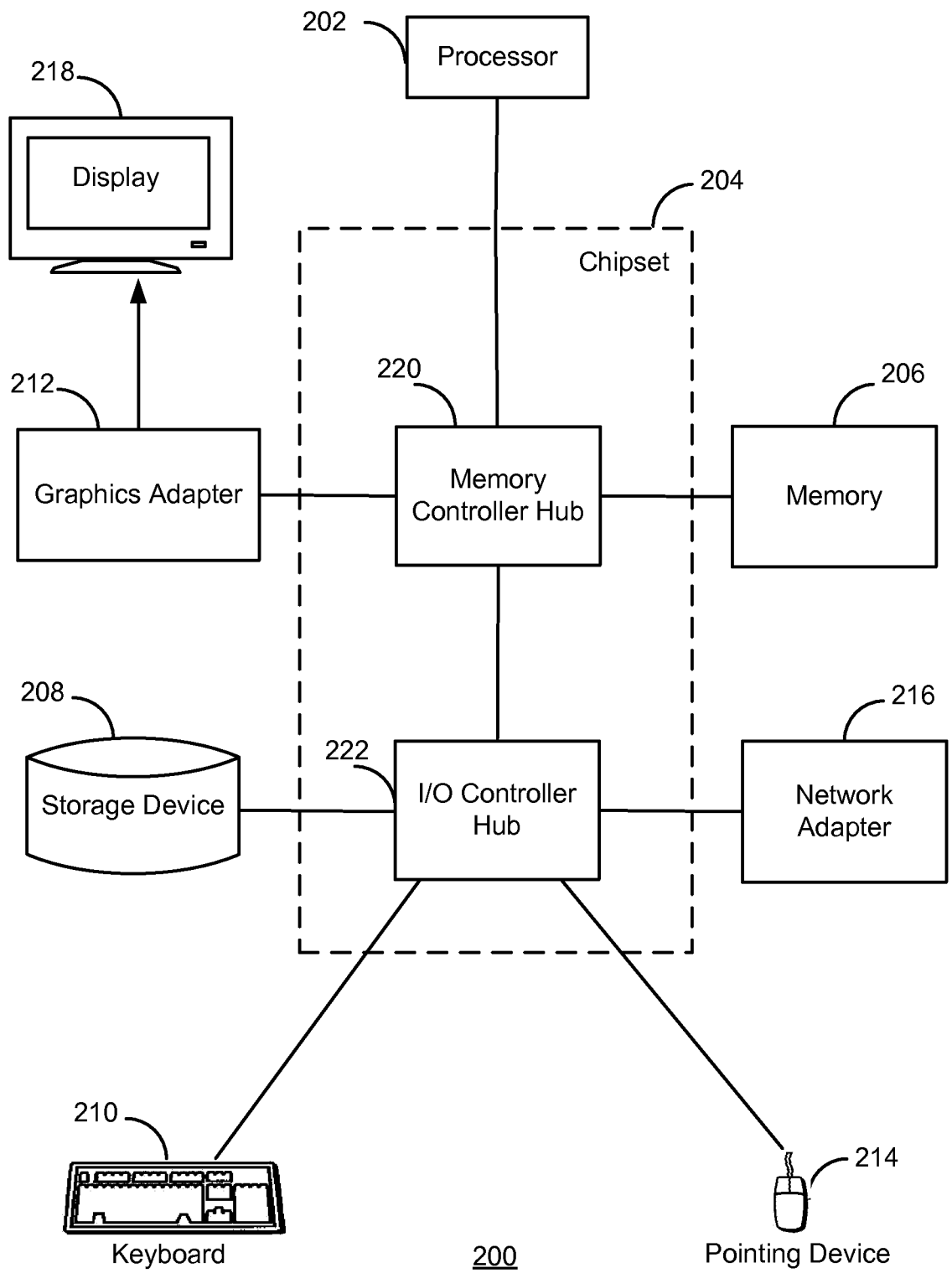
FIG. 2 is a high-level block diagram of a computer system for automatically redistributing data of multiple file systems in a distributed storage system according to one embodiment.

FIG. 2 is a high-level block diagram of a computer 200 for use as the client devices 105 or the distributed storage system 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the distributed storage system 110 is formed of multiple spatially and/or time distributed blade computers and lacks a keyboard 210, pointing device 214, graphics adapter 212, and/or display 218. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Data Management Module

Figure 3:
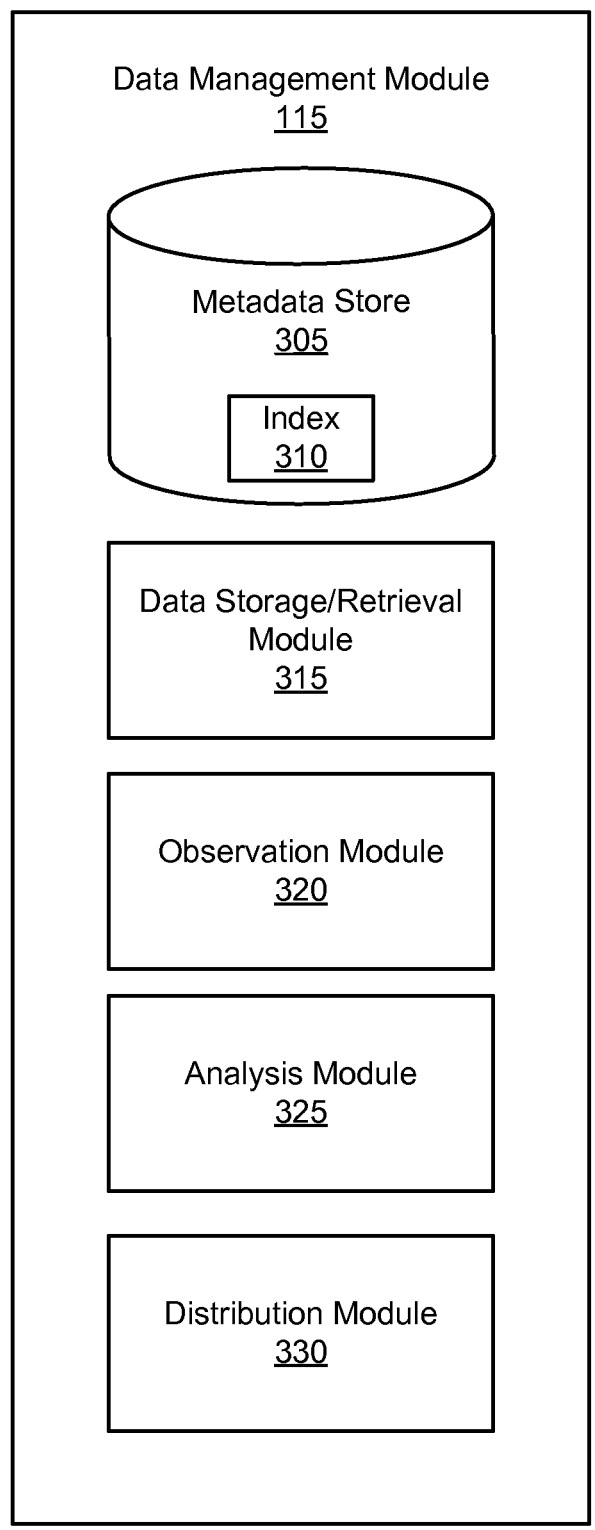
FIG. 3 is a high-level block diagram illustrating a detailed view of modules within a data management module according to one embodiment.

FIG. 3A is a high-level block diagram illustrating a detailed view of modules within the data management module 115 according to one embodiment. Some embodiments of the data management module 115 have different and/or other modules than the ones described herein. Similarly, the functions can be distributed among the modules in accordance with other embodiments in a different manner than is described here. Likewise, the functions can be performed by other entities.

The metadata store 305 stores information usable for facilitating the storage and redistribution of data in the distributed storage 122. In particular, the metadata store 305 stores device characteristic information for the storage devices 120 of the distributed storage 122. The device characteristic information may specify the bandwidth or some other performance measure of each storage device 120. Illustratively, the device characteristic information may indicate that a particular storage device 120 has a bandwidth of 50 MB/s. The device characteristic information may further specify the total capacity of each storage device 120. Illustratively, the device characteristic information may indicate that a particular storage device 120 has a storage capacity of 2 TB. The device characteristic information may additionally indicate that another storage device 120 has a storage capacity of 1 TB. The device characteristics may further comprises the amount of storage capacity available of each of several types, including RAM, solid state storage, and disk storage. In one embodiment, some of the disk storage, namely a physical storage partition located closest to the outer edge of the disk, is dedicated to a file system that requires the highest access speed, and the other file systems may share space within one or more inner partitions. In these cases, the amount of disk storage in the outer partition may be a device characteristic stored in metadata store 305. For example, the outer partition may be approximately 7% of the storage capacity of the disk. If the size of the outer partition is adjusted, for example from 7% to 8% of the disk storage capacity, this update is registered in the metadata store 305.

The metadata store 305 further stores attribute information for the data stored in the distributed storage 122. Specifically, the metadata store 305 stores information regarding the attributes of each stored data file in the distributed storage 122. In one aspect, the attribute information includes access pattern data for each data file. The access pattern data for a given data file includes a timestamp indicating when the data file was last accessed (e.g., written to or read from). The access pattern data for the data file additionally or alternatively includes other information, such as the number of times the data file has been accessed over a predefined time period (e.g., in the last 24 hours, week, etc.) and/or the number of times the data file has been accessed since being stored in the distributed storage 122.

In one aspect, the metadata store 305 furthermore stores information regarding multiple file systems managed by the data management module 115. Such information may include, for example, file system identification information, account information, access control information, organizational structure information, and/or other operational information for each file system. Illustratively, the metadata store 305 may store a unique identifier for each file system, user accounts associated with each file system, access control lists for data associated with each file system, directory structure information for each file system, etc. The metadata store 305 may also store relative rankings among the file systems by access speed required for those file systems and the size of the file systems for at least the file system with the highest access speed required. This data can be used to ensure that the physical partitions of the disks are sized appropriately to handle the file system with the highest access speed required.

In one aspect, the metadata store 305 additionally stores a data index 310. The data index 310 maps each stored data file to one or more storage devices 120 where at least a portion of the data file is currently stored. For example, the data index 310 can include an entry associating an identifier for a data file and one or more identifiers for storage devices 120 currently storing the data file. The data index 310 moreover maps each data file to a particular file system with which the data file is associated. For example, the data index 310 can include an entry associating a unique identifier of a data file with a unique identifier for a file system associated with the data file. In this way, the file system with which the data file is associated may be determined.

The metadata store 305 moreover stores other types of information usable for facilitating the storage and redistribution of data. For example, the metadata store 305 can store redundancy information. Such redundancy information can indicate which storage devices 120 store the same data for purposes of fault tolerance. The redundancy information can be leveraged to ensure that the same data is not redistributed for storage on the same storage device 120.

The data storage/retrieval module 315 stores data in the distributed storage 122 received from the client devices 105, including various received data files. In storing a particular data file, the data storage/retrieval module 315 selects one or more storage devices 120 of the distributed storage 122 and stores the data file in the selected storage devices 120. The data storage/retrieval module 315 additionally updates the data index 310 such that the data file can be later retrieved. More specifically, the data storage/retrieval module 315 may update the data index 310 to indicate the storage devices 120 storing the data file.

In addition to storing data, the data storage/retrieval module 315 retrieves data requested by the client devices 105. To retrieve a particular data file, the data storage/retrieval module 315 references the data index 310 to determine the storage devices storing the data file. Based on the determined information, the data storage/retrieval module 315 retrieves the data file from the storage devices 120, and sends the data file to the requesting client device 105, subject to any access controls associated with the files.

The observation module 320 monitors accesses to the stored data of the distributed storage 122 and stores access pattern data for the stored data in the metadata store 305. More specifically, during operation, the observation module 320 identifies data operations (e.g., read or write operations) to the data files stored in the distributed storage 122. Each time a data operation to a particular data file is identified, the observation module 320 updates access pattern data for the data file in the metadata store 305. Specifically, after identifying a data operation to a data file, the observation module 320 updates a timestamp in the access pattern data for the data file to the current time. In doing so, it can be determined when the data file was last accessed. In one embodiment, the observation module 320 additionally or alternatively increases a count indicating the number of times the data file has been accessed over a particular period of time. For example, the observation module 320 may update a count for the number of times the data file was accessed in the last hour, day, week, month, or year. The observation module 320 may further increase a count indicating the total number of times the data file has been accessed since being stored in the distributed storage 122. As will be discussed, the access pattern data enables the data of the distributed storage 122 to be redistributed.

The analysis module 325 determines whether to redistribute data stored in the distributed storage 122. Furthermore, based on a determination to redistribute the data, the analysis module 325 assigns target amounts of each storage device 120's storage space to the file systems managed by the data management module 115. The assigned target amounts, as will be discussed, enable the redistribution of data stored in the distributed storage 122. In one aspect, assignment of the target amounts is performed according to a particular redistribution scheme or policy. Examples of redistribution schemes include a uniform redistribution scheme and a proportional redistribution scheme. Such schemes will also be discussed in greater detail below.

In one aspect, the analysis module 325 is adapted to periodically determine whether to redistribute the data stored in the distributed storage 122. The analysis module 325 initiates the performance of such a determination at any suitable predefined interval. For example, the analysis module 325 may perform such a determination on an hourly, daily, weekly, monthly, or yearly basis. During such a process, the analysis module 325 may reconsider the amount of disk space to dedicate to the fastest access file system in the outer partition of one or more disks, as discussed above, and make adjustments if the dedicated partition is too small or too large.

In one embodiment, determination of whether to redistribute the data of the distributed storage 122 is performed by the analysis module 325 based on suitable criteria. In one implementation, the analysis module 325 determines whether to redistribute data based on a measured performance level of the distributed storage 122. More specifically, the analysis module 325 may periodically measure the average data throughput of the distributed storage 122. If the measured average data throughput of the distributed storage 122 is determined to be below a particular threshold throughput, the analysis module 325 initiates a redistribution of the data. In another implementation, the analysis module 325 determines to redistribute the data automatically following determination of an addition or removal of a storage device 120 from the distributed storage 122, following determination of a failure of a storage device 120 of the distributed storage 122, following determination that a redundant array of independent disks (RAID) of the distributed storage 122 has been rebuilt, after identification of a relatively large data archiving action performed by the data storage/retrieval module 315, etc. In one embodiment, the analysis module 325 initiates the redistribution of the data without requiring any specific criteria to be met. Rather, redistribution of the data occurs automatically based on the predefined interval.

Following a determination that data redistribution be performed, the analysis module 325 assigns target amounts of each storage device 120's storage space to each file system managed by the data management module 115. To assign the target amounts of storage space, the analysis module 325 determines an average access pattern level for each file system. To make such a determination, the analysis module 325 identifies access patterns for all or a representative sample of the data associated with each file system. Specifically, for a given file system, the analysis module 325 identifies data files associated with the given file system by accessing the metadata store 305. The analysis module 325 further obtains access pattern data for the associated data files from the metadata store 305. As discussed previously, the access pattern data may indicate, for each data file, the last time the data file was accessed. The access pattern data may alternatively or additionally indicate, for each data file, a number of accesses to the data file over a predefined period and/or since being stored in the distributed storage 122.

Based on the access pattern data, the analysis module 325 computes average access pattern levels for each file system. Such a computation may be performed in any suitable manner. In one embodiment, the computation is performed by summing the access pattern values (e.g., the last accessed times or the numbers of accesses) of a file system's associated data files and dividing the sum by the number of associated data files. As a simple example, a given file system may be associated with a first data file and a second data file. The first data file may have been last accessed five minutes ago. The second data file may have been last accessed fifteen minutes ago. Thus, the analysis module 325 computes an average last accessed time of ten minutes for the given file system. As another simple example, a given file system may be associated with a first data file and a second data file. The first data file may have been accessed 200 times in the previous 72 hours. The second data file may have been accessed 100 times in the previous 72 hours. Thus, the analysis module 325 computes an average number of accesses equal to 150 for the give file system.

In one aspect, file systems associated with higher probabilities of being accessed frequently in the future are considered "hotter." In one aspect, file systems associated with more recent average last accessed times are determined to have higher probabilities of being accessed frequently in the future. Hence, for example, a file system associated with an average last accessed time of five minutes is considered more likely to be accessed in the future than another file system associated with an average last accessed time of ten minutes. Likewise, file systems associated with larger average numbers of accesses are also considered to have higher probabilities of being accessed frequently in the future. For example, a file system associated with an average number of 200 accesses may be considered to be more likely to be frequently accessed in the future than a file system associated with an average number of 100 accesses.

In addition to determining the average access pattern levels, the analysis module 325 determines space requirements for each file system. For example, the analysis module 325 may determine that a first file system requires 200 TB of storage space for its associated data, and that a second file system requires 300 TB of storage space for its associated data. In one implementation, the analysis module 325 determines the space requirements for each file system based on the total amount of space currently used to store data associated with the file system. In another implementation, the analysis module 325 determines the space requirements for each file system based on a projected amount of space that the file system will need for its associated data over a predefined period. For example, the analysis module 325 may determine that the data associated with a particular file system will likely require 100 TB of storage space in the next thirty days. Such a projection may be based on, for example, the historical space requirements of the file system, the projected growth of the amount of data associated with the file system, the projected growth in the number of users or transactions associated with the file system, the types of processing performed by the client devices 105, etc.

The analysis module 325 furthermore obtains device characteristic information for each storage device 120. In particular, the analysis module 325 obtains information regarding the storage capacity of each storage device 120. For example, the analysis module 325 may obtain information specifying that a particular storage device 120 has a capacity of 2 TB. The analysis module 325 furthermore obtains information regarding the bandwidth or some other performance measure of each storage device 120. For example, the analysis module 325 may obtain information indicating that the bandwidth of a particular storage device 120 is 65 MB/s. In one implementation, the analysis module 325 accesses the metadata store 305 to obtain the aforementioned device characteristic information. In another implementation, the analysis module 325 requests device characteristic information from each storage device 120, and responsively receives the requested device characteristic information from the storage device 120.

In one embodiment, based on the average access pattern levels, file system space requirements, and device characteristic information, the file system analysis module 120 assigns a target amount of storage space of each storage device 120 to each file system. Each target amount indicates the amount of data associated with a file system that can be stored on a particular storage device 120 following redistribution. In one aspect, the analysis module 325 assigns the target amounts of storage space to the file systems in descending order by average access pattern level hotness. More specifically, the analysis module 325 begins by assigning target amounts of storage space to a file system associated with a most recent average last accessed time or a largest average number of accesses. Thereafter, the analysis module 325 assigns target amounts of storage space to file systems associated with progressively less recent average last accessed times or smaller average numbers of accesses.

In one embodiment, the analysis module 325 determines the target amounts of storage space assigned to file systems based on a uniform distribution scheme. To determine the target amounts of storage space assigned to a particular file system, the analysis module 325 divides the total space required by the file system by the number of available storage devices 120 in the distributed storage 122. For example, a first file system may require 10 TB of data. The distributed storage system may include 1,000 storage devices 120. Thus, each storage device 120 is assigned to store a target of 10 GB of data associated with the file system. In this way, the analysis module 325 attempts to have data associated with the file system to be spread uniformly across the available storage devices 120, which improves overall data throughput of the distributed storage system 110. In one aspect, following assignment of the storage space of a particular storage device 120, the total storage space of the particular storage device 120 available for assignment to subsequently processed file systems is decreased accordingly.

In another embodiment, the analysis module 325 determines the target amounts of storage space assigned to file systems based on a proportional distribution scheme. More specifically, the analysis module 325 assigns target amounts of storage space of the storage devices 120 to a particular file system based at least in part on the bandwidths or some other performance measures of the storage devices 120. In order to assign the target amounts of storage space, the analysis module 325 sums the bandwidths of the storage devices 120 to determine a total bandwidth value. Thereafter, the analysis module 325 determines a proportional bandwidth value for each storage device 120 through dividing the individual bandwidth of the storage device 120 by the total bandwidth value. For example, the individual bandwidth of a particular storage device 120 may be 30 MB/s. The total bandwidth value of the storage devices 120 may be 100 MB/s. As such, the proportional bandwidth value for the storage device 120 is a value of 0.3.

Thereafter, the analysis module 325 computes, for each storage device 120, a target amount of storage space to be assigned to the particular file system, where the target amount is proportional to the bandwidth of the storage device 120. To determine the target amount to be assigned, the analysis module 325 multiplies the proportional bandwidth value of the particular storage device 120 by the space requirements for the particular file system. The result of the multiplication is then used by the analysis module 325 as the target amount assigned to the file system. For example, the space requirements for a particular file system may be 1 TB. Thus, with reference to the previous example, the target amount of space for the particular storage device 120 is the product of 1 TB and 0.3, or 300 GB. In this way, the analysis module 325 attempts to have the data associated with the file system spread proportionally across the available storage devices 120 based on bandwidth, which may further improve the overall data throughput of the distributed storage system 110. In one aspect, following assignment of the storage space of the particular storage device 120, the total storage space of a particular storage device 120 available for assignment to subsequently processed file systems is decreased accordingly.

In either embodiment employing the previously described distribution schemes, if a target amount assigned to a file system would cause a storage device 120 to exceed its maximum storage capacity, the analysis module 325 performs additional processing to account for the "full" storage device 120. For example, a storage device 120 may have 150 GB of storage available for assignment. If the computed target amount for a file system would cause the storage device 120 to be assigned to store greater than 150 GB of data, the analysis module 325 performs additional processing.

In performing the additional processing, the analysis module 325 assigns, to the file system, the entirety of the available storage space of the storage device 120. For example, the computed target amount assigned to the storage device 120 for a file system may be 1 TB. However, the storage device 120 may only have 250 GB of storage space available for assignment. Thus, the analysis module 325 assigns the remaining 250 GB to the file system. Thereafter, the analysis module 325 decreases the target amount for the file system for the storage device 120 by the remaining available storage capacity to obtain a balance of the target amount. Thereafter, the analysis module 325 assigns, to the file system, storage space equal to the balance from the remaining storage devices 120 with available storage capacity. Referring to the previous example, the balance of the target amount is 750 GB. Thus, the analysis module 325 assigns, to the file system, 750 GB of storage space from the storage devices 120 with available storage space. The analysis module 325 additionally removes the "full" storage device 120 from future consideration for storage assignment. Hence, assignments of storage space to subsequently processed file systems may be based on the remaining storage devices 120.

In addition, the analysis module 325 may make assignment decisions based at least in part on the presence of a dedicated physical partition implemented in at least some of the disks of the distributed storage system 122 for storing data from the file system that requires the highest access speed. In one embodiment, the analysis module 325 assign the outer partition of a plurality of disks to the file system that contains the data accessed most frequently. In other words, the data for the file system that is accessed the most frequently will be stored in the locations on the disk that offer the fastest access, thus improving the average performance of the distributed storage system 122.

The distribution module 330 generates a redistribution plan for the data of the distributed storage 122, and distributes the data according to the generated redistribution plan. In one embodiment, the generated redistribution plan includes a redistribution table. Each entry of the redistribution table specifies a quantity of data to be moved, a source storage device 120 from which data is to be moved, a target storage device 120 to which data is to be moved, and the file system associated with the data to be moved.

To generate the redistribution plan, the distribution module 330 identifies a source storage device 120 currently storing an amount of data for a particular file system that is greater than the target amount of storage space for the storage device 120 assigned to the particular file system. The distribution module 330 then selects an amount of data associated with the particular file system equal to or approximately equal to the difference between the amount of data associated with the particular file system currently stored by the source storage device 120 and the target amount of storage space assigned to the particular file system for the source storage device 120. As used herein, the selected data may be referred to as "excess" data. For example, a storage device 120 may currently be storing 100 GB of data associated with a particular file system. The target amount of storage space of the storage device 120 assigned to the particular file system may be 25 GB. Thus, the distribution module 330 selects an excess amount of data equal to 75 GB from the 100 GB of data associated with the particular file system.

After selecting the excess data, the distribution module 330 identifies one or more target storage devices 120 to which the selected excess data may be moved or shifted. In particular, the distribution module 330 identifies one or more target storage devices 120 each currently storing an amount of data associated with the particular file system that is less than the target amount of storage space of the target storage device 120 assigned to the particular file system. Based on the selected excess data and the target amounts of the one or more target storage devices 120, the distribution module 330 determines a portion of the excess data to be redistributed to each of the one or more target storage devices. Based on the determinations, the analysis module 325 inserts one or more entries to the redistribution table indicating the portions of the selected excess data to be redistributed to the one or more target storage devices 120.

In one embodiment, identification of the one or more target storage devices 120 may be additionally based on other information. For example, the distribution module 330 may be constrained from selecting certain target storage devices 120 that have been flagged as being forbidden with respect to certain data in the selected excess data. Illustratively, the distribution module 330 may retrieve redundancy information for certain data from the metadata store 305. Based on the redundancy information, the distribution module 330 identifies those storage devices 120 on which the data cannot be stored for purposes of fault tolerance. As a result, the distribution module 330 does not select, as a target, those storage devices 120 identified by the redundancy information.

In one aspect, the distribution module 330 repeats the selection of data for redistribution until, for each file system, each storage device 120 storing an excess amount of data for the file system has been processed for redistribution. Thereafter, the distribution module 330 redistributes the data according to the generated redistribution plan. More specifically, the distribution module 330 moves data specified in the redistribution table of the plan from the source storage devices 120 to the identified target storage devices 120. The distribution module 330 further updates the data index 310 of the metadata store 305 to reflect the new storage locations of the redistributed data. In one aspect, the distribution module 330 may complete multiple redistribution passes. Determination of whether to perform a subsequent redistribution pass may be based on any suitable criteria.

Figure 4:
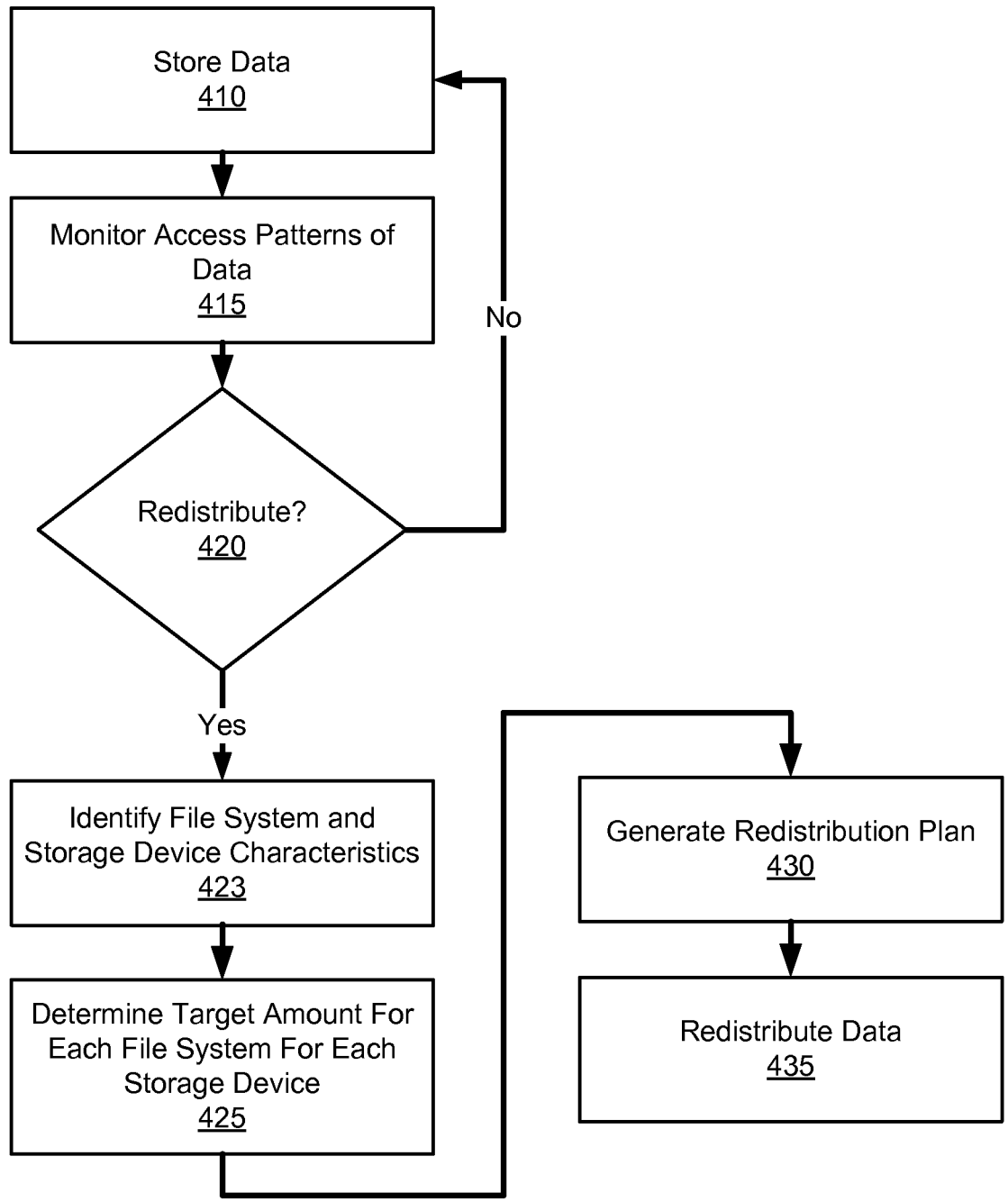
FIG. 4 is a flow chart illustrating a method for automatically redistributing data of multiple file systems in a distributed storage system according to one embodiment.

Method for Redistributing Data of Multiple File Systems in a Distributed Storage System FIG. 4 is a flowchart illustrating a method for redistributing data of multiple file systems in a distributed storage system according to one embodiment. Other embodiments can perform the steps of the method in different orders and can include different, additional and/or fewer steps. Likewise, multiple instances of the steps may be performed in parallel.

The method shown in FIG. 4 can be performed by the data management module 115. In particular, the data management module 115 stores 410 data associated with multiple file systems in the storage devices 120 of the distributed storage 122. For example, the data management module 115 may store one or more data files received from the client devices 105. Subsequently, the data management module 115 monitors 415 the access patterns of the data. Such access patterns are stored in the metadata store 305. At a later time, the data management module 115 determines 420 whether to redistribute the stored data in order to improve the overall data throughput of the distributed storage 122. If it is determined that the data is to be redistributed, the data management module 115 identifies 423 various characteristics of the file systems and the storage devices 120. In particular, the data management module 115 determines average access pattern levels for each of the file systems. The data management module 115 additionally determines the storage requirements for each file system. Moreover, the data management module 115 identifies the storage capacities and bandwidths of the storage devices 120. Based on the identified information, the data management module 115 determines 425 a target amount of storage space of each storage device 120 to be assigned to each file system. For storage devices that include disks, this may include the target amount of each of a plurality of disks to physically partition separately into an outer partition and dedicate to the file system that requires the fastest access speeds. The remaining file systems are left to share one or more inner partitions of these disks. Thereafter, the data management module 115 generates 430 a redistribution plan. The redistribution plan indicates the data to be moved or shifted from a number of source storage devices to a number of target storage devices. In one aspect, the redistribution plan is generated based on the determined target amounts of storage space assigned to each file system. After generating the redistribution plan, the data management module 115 redistributes 435 the stored data across the storage devices 120 according to the redistribution plan. In some instances, the data management module 115 may perform multiple passes of the method shown in FIG. 4.

Figure 5A:
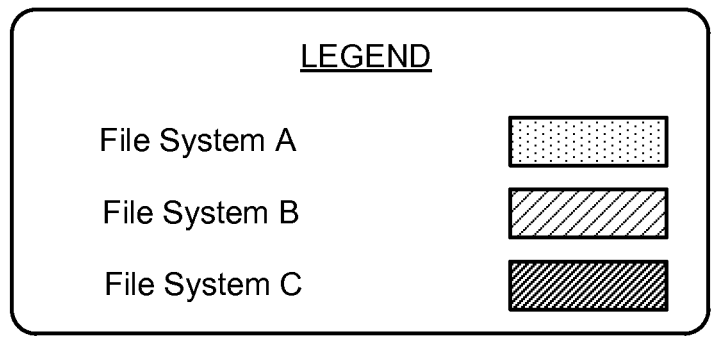
FIGS. 5A and 5B are diagrams together showing an example of the redistribution of the data of multiple file systems according to a uniform distribution scheme according to one embodiment.
Figure 5A:
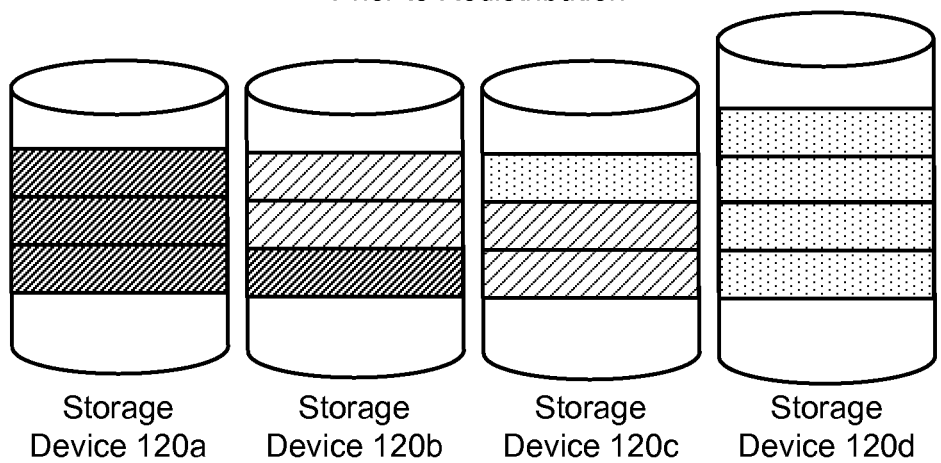
Figure 5B:
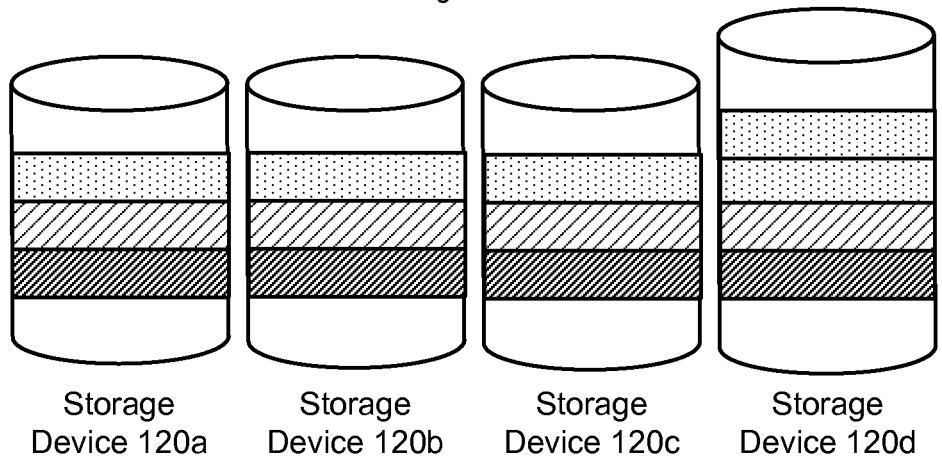

Example of the Redistribution of Data According to a Uniform Distribution Scheme FIGS. 5A and 5B are diagrams that together show the redistribution of data according to a uniform distribution scheme according to one embodiment. As discussed, the uniform distribution scheme may be employed to compute target amounts for use in data redistribution. Referring to FIG. 5A, it shows an example of data stored by four interconnected storage devices 120a-120d of the distributed storage 122 prior to redistribution. The storage devices 120a-120d may have different storage capacities. For example, the storage devices 120a-120c may each have 1 TB of storage capacity while the storage device 120d may have 2 TB of storage capacity. As shown in FIG. 5A, the data stored by the storage devices 120a-120d are associated with different file systems. More specifically, different portions or sets of the data are associated either with a file system A, a file system B, or a file system C. In the example shown in FIG. 5A, file system C is considered the "hottest" or most frequently accessed file system. As further shown in FIG. 5A, a large amount of data associated with the file system C is concentrated in the storage device 120a. Because the data from a "hot" file system is primarily concentrated in the storage device 120a, the overall data throughput of the distributed storage 122 may be relatively poor with respect to the file system C.

Referring now to FIG. 5B, it shows an example of the data stored by the four interconnected storage devices 120a-120d following redistribution. As shown in FIG. 5B, data associated with the file system C is uniformly distributed across each of the storage devices 120a-120d, which enables improvement in the data throughput of the distributed storage 122 with respect to the file system C. The data of the less "hot" file systems A and B are also distributed as uniformly as possible. However, during computation of target amounts for the file system A, the maximum capacity of the storage devices 120a-120c will be reached. As a result, a nonuniform amount of data associated with the file system A is eventually stored for the file system A.

Figure 5C:
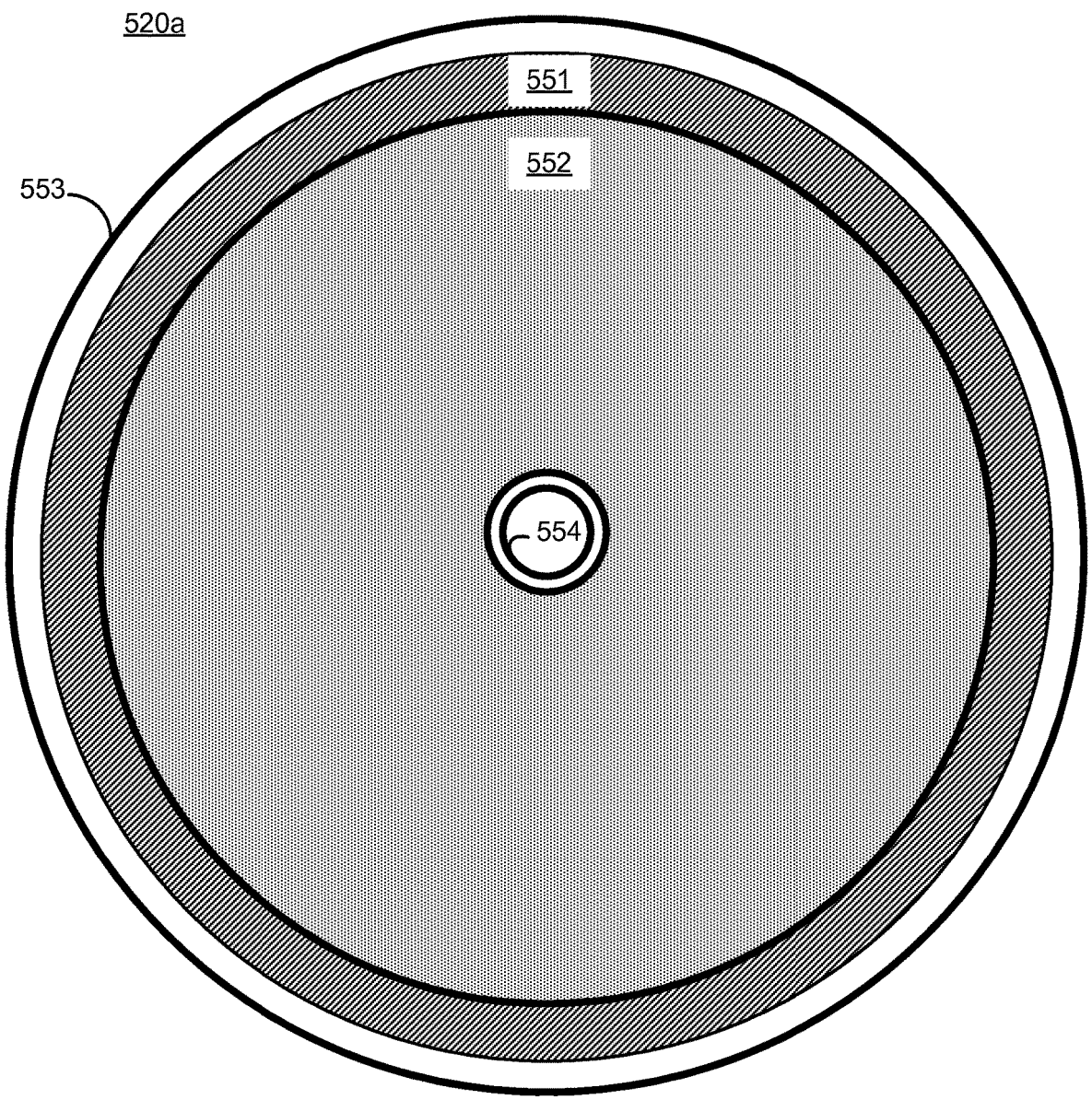
FIG. 5C illustrates the physical partitions of a disk of a storage device illustrated in FIG. 5B, in accordance with an embodiment.

FIG. 5C illustrates the physical partitions of a disk 520a of storage device 120a after the redistribution illustrated in FIG. 5B. As illustrated in this example, the data corresponding to file system C, the "hottest" data, is placed in an outer physical partition 551 of the disk 520a, nearest the outer edge of the disk 553. In this example, the data corresponding to file systems A and B, which contain less "hot" data share the inner partition 552 of the disk 520a, nearest the inner edge of the disk 554. Because the most frequently accessed data are stored near the outer edge of the disk, the access speed for repeated reads and writes of those data are faster than they would have been on average without partitioning of the disk. Accordingly, implementations that include disks with an outer physical partition dedicated to the file system with the most frequently accessed data may offer improved performance as compared to implementations that do not include physical partitioning of disks.

Figure 6A:
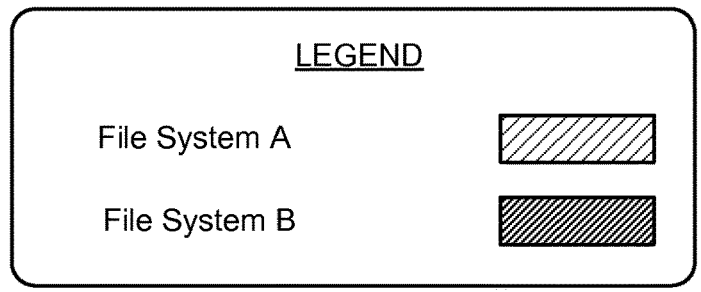
FIGS. 6A and 6B are diagrams together showing an example of the redistribution of the data of multiple file systems according to a proportional distribution scheme according to one embodiment.
Figure 6A:
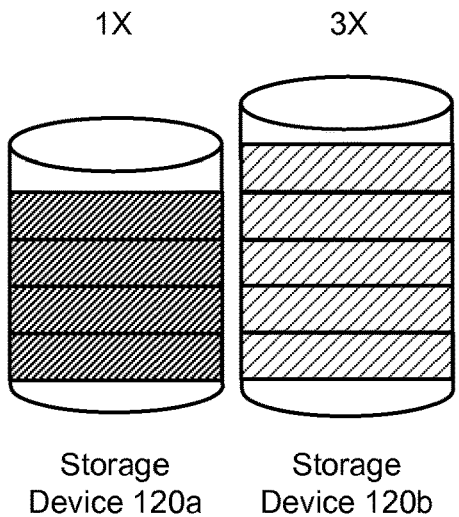
Figure 6B:
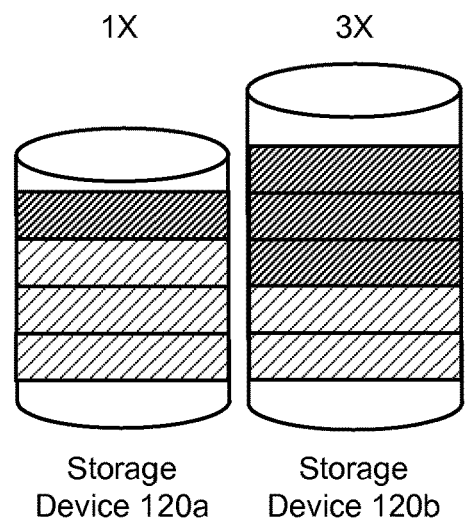

Example of the Redistribution of Data According to a Proportional Distribution Scheme FIGS. 6A and 6B are diagrams that together show the redistribution of data according to a proportional distribution scheme according to one embodiment. As discussed, the proportional distribution scheme may be employed to compute target amounts for use in data redistribution. Referring now to FIG. 6A, it shows an example of the data stored by the two interconnected storage devices 120a and 120b of the distributed storage 122 prior redistribution. The storage devices 120a and 120b each have different storage capacities. For example, the storage devices 120a may have a storage capacity of 1 TB while the storage device 120b may have a storage capacity of 2 TB. The storage devices 120a and 120b additionally have different bandwidths. As shown in FIG. 6A, the storage device 120b has three times the bandwidth of the storage device 120a. As further shown, the data stored by the storage devices 120a and 120b are associated with various file systems. Specifically, different portions or sets of the data stored by the storage devices 120 are associated either with a file system A or a file system B. In the example, the file system B is considered the "hotter" or more frequently accessed file system. As further shown in FIG. 6A, a large amount of the data associated with the file system B is concentrated in the storage device 120a. Because the data from a "hot" file system is primarily concentrated in the slower storage device 120a, the overall data throughput of the distributed storage 122 may be relatively poor with respect to the file system B.

Referring now to FIG. 6B, it shows an example of the data stored by the two interconnected storage devices 120a and 120b following redistribution according to a proportional distribution scheme. As shown in FIG. 6B, because the storage device 120b is three times faster than the storage device 120a, the storage device 120b is configured to store three times more data associated with the file system B than the storage device 120a. In this way, the data throughputs of the storage device 120a and 120b with respect to the data of the file system B can be roughly equal, which minimizes the overall time required to access the data of the file system B. It should be appreciated that the proportional distribution scheme also attempts to proportionally assign target amounts to the less "hot" file system A. However, during assignment of the target amounts for the file system A, the maximum capacity of the storage device 120b will be reached. As a result, a disproportionate amount of data associated with the file system A is eventually stored in the storage device 120b.

Figure 6C:
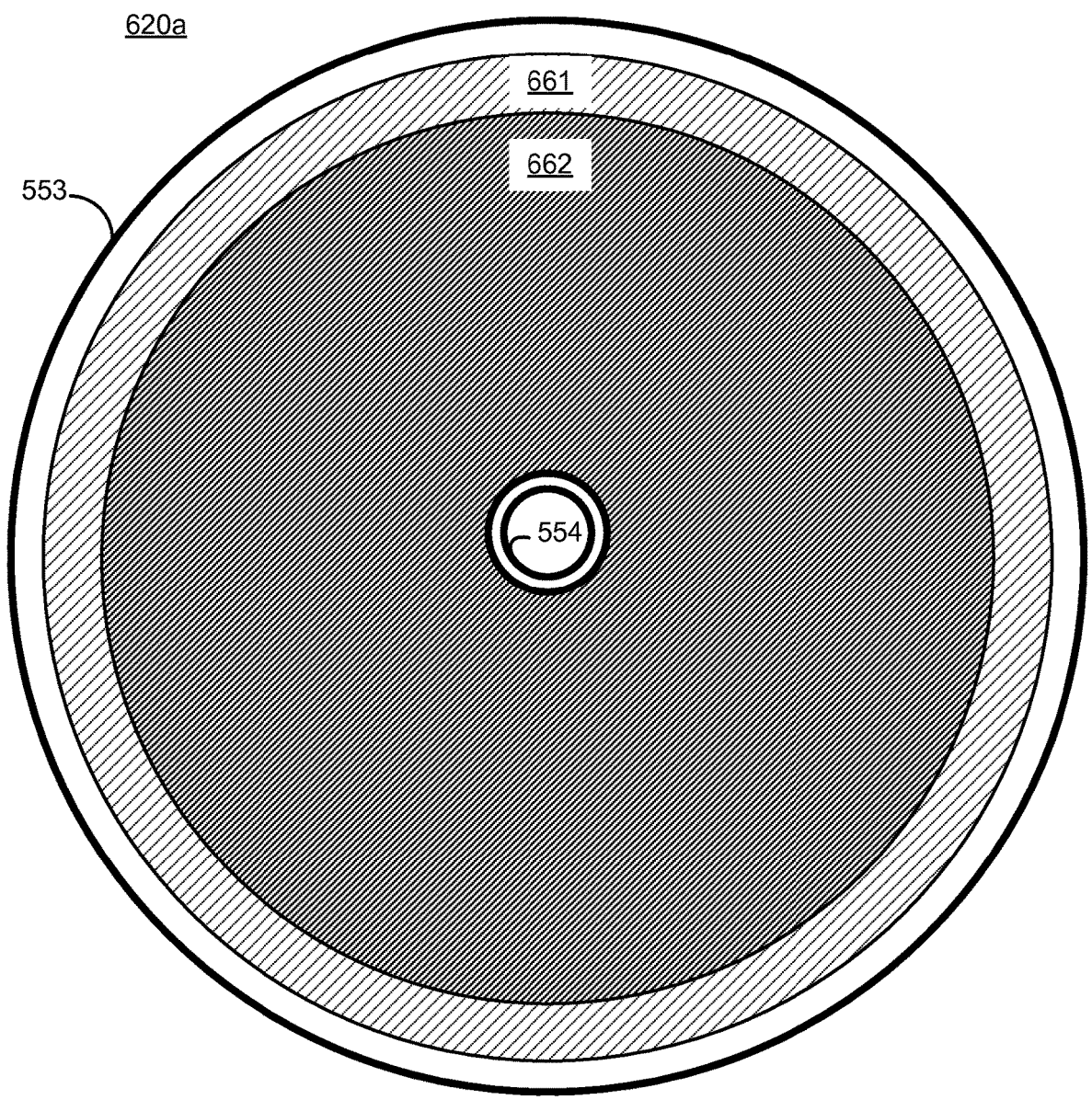
FIG. 6C illustrates the physical partitions of a disk of a storage device illustrated in FIG. 6B, in accordance with an embodiment.

FIG. 6C illustrates the physical partitions of a disk 620a of storage device 120a after the redistribution illustrated in FIG. 6B. As illustrated in this example, the data corresponding to file system A, the "hot" file system, is placed in an outer physical partition 661 of the disk 620a, nearest the outer edge of the disk 553. In this example, the data corresponding to file systems B, which contains less "hot" data is stored in the inner partition 662 of the disk 620a, nearest the inner edge of the disk 554. Because the most frequently accessed data are stored near the outer edge of the disk, the access speed for repeated reads and writes of those data are faster than they would have been on average without partitioning of the disk. Accordingly, implementations that include disks with an outer physical partition dedicated to the file system with the most frequently accessed data may offer improved performance as compared to implementations that do not include physical partitioning of disks.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A method for distributing data stored in a distributed storage system comprising a plurality of storage devices, wherein at least one storage device is a disk, the method comprising:

maintaining a plurality of logically independent file systems, wherein each file system comprises a corresponding data set stored by the distributed storage, wherein each data set comprises at least one corresponding data file;

establishing an outer partition and an inner partition on the least one disk, the outer partition located closer to an outer edge of the respective disk than the inner partition;

(A) determining file system access patterns by observing accesses to the at least one data file corresponding to each of the file systems; and (B) responsive to identifying, based on the determined file system access patterns, a first file system having a highest probability of future access among the plurality of file systems, wherein remaining file systems comprise the plurality of files systems excluding the first file system:

distributing the data set of the first file system across the at least one outer partition;

and distributing the data sets of the remaining file systems, comprising:

determining a corresponding storage requirement for each of the remaining file systems;

obtaining a corresponding storage capacity for each of the plurality of storage devices, wherein the corresponding storage capacity of the at least one disk excludes a storage capacity of the corresponding outer partition;

calculating a target amount of storage space corresponding to each of the remaining file systems for each of the plurality of storage devices by dividing the corresponding storage requirement for each of the remaining files systems by a number of the plurality of storage devices; and responsive to determining that the target amount of data corresponding to a particular storage device exceeds an available storage capacity of the particular storage device:

calculating a decreased target amount of data corresponding to each of the remaining file systems for the particular storage device such that the decreased target amount of data corresponding to the particular storage device is equal to or less than the available storage capacity; and calculating an updated target amount of storage space corresponding to each of the remaining file systems for each of the plurality of storage devices, comprising:

reducing the corresponding storage requirement for each of the remaining files systems by the decreased target amount; and dividing the corresponding reduced storage requirement for each of the remaining files systems by the number of the plurality of storage devices reduced by one;

distributing the data sets corresponding to the decreased target amount of each of the remaining file systems to the storage of the particular storage device; and distributing the data sets corresponding to the updated target amount of each of the remaining files systems across the storage of the plurality of storage devices excluding the particular storage device.

2. The method of claim 1, further comprising, responsive to a trigger:

repeating step (A) to determine new file system access patterns; and repeating step (B) to:
identify a new first file system having the highest probability of future access among the plurality of file systems and new remaining file systems;
distribute the data set of the new first file system across the at least one outer partition;
calculate a new target amount of storage space corresponding to each of the new remaining file systems for each of the plurality of storage devices;
calculate a new decreased target amount corresponding to each of the new remaining file systems for the particular storage device;
calculate a new updated target amount of storage space corresponding to each of the new remaining file systems for each of the plurality of storage devices;
distribute the data sets corresponding to the new decreased target amount of each of the new remaining file systems to the storage of the particular storage device; and
distribute the data sets corresponding to the new updated target amount of each of the remaining files systems to storage of the plurality of storage devices excluding the particular storage device.

3. The method of claim 2, wherein the trigger is based on a measured performance level of the distributed storage system.

4. The method of claim 3, wherein the trigger is based on determining that a specific storage device is storing data sets for a specific file system that is greater that the target amount of storage space for the specific storage device.

5. A non-transitory computer-readable storage medium storing processor-executable computer program instructions that, when executed, cause a computer processor to perform a method for distributing data stored in a distributed storage system comprising a plurality of storage devices, wherein at least one storage device is a disk, the method comprising:

a method for distributing data stored in a distributed storage system comprising a plurality of storage devices, wherein at least one storage device is a disk, the method comprising:

maintaining a plurality of logically independent file systems, wherein each file system comprises a corresponding data set stored by the distributed storage, wherein each data set comprises at least one corresponding data file;

establishing an outer partition and an inner partition on the least one disk, the outer partition located closer to an outer edge of the respective disk than the inner partition;

(A) determining file system access patterns by observing accesses to the at least one data file corresponding to each of the file systems; and (B) responsive to identifying, based on the determined file system access patterns, a first file system having a highest probability of future access among the plurality of file systems, wherein remaining file systems comprise the plurality of files systems excluding the first file system:

distributing the data set of the first file system across the at least one outer partition;

and distributing the data sets of the remaining file systems, comprising: determining a corresponding storage requirement for each of the remaining file systems;

obtaining a corresponding storage capacity for each of the plurality of storage devices, wherein the corresponding storage capacity of the at least one disk excludes a storage capacity of the corresponding outer partition;

calculating a target amount of storage space corresponding to each of the remaining file systems for each of the plurality of storage devices by dividing the corresponding storage requirement for each of the remaining files systems by a number of the plurality of storage devices;

and responsive to determining that the target amount of data corresponding to a particular storage device exceeds an available storage capacity of the particular storage device:

calculating a decreased target amount of data corresponding to each of the remaining file systems for the particular storage device such that the decreased target amount of data corresponding to the particular storage device is equal to or less than the available storage capacity; and calculating an updated target amount of storage space corresponding to each of the remaining file systems for each of the plurality of storage devices, comprising:

reducing the corresponding storage requirement for each of the remaining files systems by the decreased target amount;

and dividing the corresponding reduced storage requirement for each of the remaining files systems by the number of the plurality of storage devices reduced by one;

distributing the data sets corresponding to the decreased target amount of each of the remaining file systems to the storage of the particular storage device;

and distributing the data sets corresponding to the updated target amount of each of the remaining files systems across the storage of the plurality of storage devices excluding the particular storage device.

6. The non-transitory computer-readable storage medium of claim 5, wherein the method further comprises, responsive to a trigger:

repeating step (A) to determine new file system access patterns;

and repeating step (B) to:
determine a new first file system having the highest probability of future access among the plurality of file systems and new remaining file systems;
distribute the data set of the new first file system across the at least one outer partition;
calculate a new target amount of storage space corresponding to each of the new remaining file systems for each of the plurality of storage devices;
calculate a new decreased target amount corresponding to each of the new remaining file systems for the particular storage device;
calculate a new updated target amount of storage space corresponding to each of the new remaining file systems for each of the plurality of storage devices;
distribute the data sets corresponding to the new decreased target amount of each of the new remaining file systems to the storage of the particular storage device;

and distribute the data sets corresponding to the new updated target amount of each of the remaining files systems to storage of the plurality of storage devices excluding the particular storage device.

7. The non-transitory computer-readable storage medium of claim 6, wherein the trigger is based on a measured performance level of the distributed storage system.

8. The non-transitory computer-readable storage medium of claim 7, wherein the trigger is based on determining that a specific storage device is storing data sets for a specific file system that is greater that the target amount of storage space for the specific storage device.

9. A system comprising:
a processor; and
a non-transitory computer-readable storage medium storing processor-executable computer program instructions that, when executed, cause a computer processor to perform a method for
distributing data stored in a distributed storage system comprising a plurality of storage devices,
wherein at least one storage device is a disk, the method comprising:
maintaining a plurality of logically independent file systems, wherein each file system comprises a corresponding data set stored by the distributed storage, wherein each data set comprises at least one corresponding data file;
establishing an outer partition and an inner partition on the least one disk, the outer partition located closer to an outer edge of the respective disk than the inner partition;
(A) determining file system access patterns by observing accesses to the at least one data file corresponding to each of the file systems; and
(B) responsive to identifying, based on the determined file system access patterns, a first file system having a highest probability of future access among the plurality of file systems, wherein remaining file systems comprise the plurality of files systems excluding the first file system:
distributing the data set of the first file system across the at least one outer partition; and
distributing the data sets of the remaining file systems, comprising:
determining a corresponding storage requirement for each of the remaining file systems;
obtaining a corresponding storage capacity for each of the plurality of storage devices, wherein the corresponding storage capacity of the at least one disk excludes a storage capacity of the corresponding outer partition;
calculating a target amount of storage space corresponding to each of the remaining file systems for each of the plurality of storage devices by dividing the corresponding storage requirement for each of the remaining files systems by a number of the plurality of storage devices; and
responsive to determining that the target amount of data corresponding to a particular storage device exceeds an available storage capacity of the particular storage device:

calculating a decreased target amount of data corresponding to each of the remaining file systems for the particular storage device such that the decreased target amount of data corresponding to the particular storage device is equal to or less than the available storage capacity; and
calculating an updated target amount of storage space corresponding to each of the remaining file systems for each of the plurality of storage devices, comprising:
reducing the corresponding storage requirement for each of the remaining files systems by the decreased target amount; and
dividing the corresponding reduced storage requirement for each of the remaining files systems by the number of the plurality of storage devices reduced by one;
distributing the data sets corresponding to the decreased target amount of each of the remaining file systems to the storage of the particular storage device; and distributing the data sets corresponding to the updated target amount of each of the remaining files systems across the storage of the plurality of storage devices excluding the particular storage device.

10. The system of claim 9, wherein the method further comprises, responsive to a trigger:
repeating step (A) to determine new file system access patterns; and
repeating step (B) to:
determine a new first file system having the highest probability of future access among the plurality of file systems and new remaining file systems;
distribute the data set of the new first file system across the at least one outer partition;
calculate a new target amount of storage space corresponding to each of the new remaining file systems for each of the plurality of storage devices;
calculate a new decreased target amount corresponding to each of the new remaining file systems for the particular storage device;
calculate a new updated target amount of storage space corresponding to each of the new remaining file systems for each of the plurality of storage devices;
distribute the data sets corresponding to the new decreased target amount of each of the new remaining file systems to the storage of the particular storage device; and
distribute data sets corresponding to the new updated target amount of each of the remaining files systems to storage of the plurality of storage devices excluding the particular storage device.

11. The system of claim 10, wherein the trigger is based on a measured performance level of the distributed storage system.

12. The system of claim 11, wherein the trigger is based on determining that a specific storage device is storing data sets for a specific file system that is greater that the target amount of storage space for the specific storage device.

* * * * *